(12) United States Patent
Kondguli et al.

(10) Patent No.: US 11,610,281 B2
(45) Date of Patent: Mar. 21, 2023

(54) METHODS AND APPARATUS FOR IMPLEMENTING CACHE POLICIES IN A GRAPHICS PROCESSING UNIT

(71) Applicant: Samsung Electronics Co., Ltd., Suwon-si (KR)

(72) Inventors: Sushant Kondguli, San Jose, CA (US); Arun Radhakrishnan, Austin, TX (US); Zachary D. Neyland, Santa Clara, CA (US); David C. Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 4 days.

(21) Appl. No.: 17/146,491

(22) Filed: Jan. 11, 2021

(65) Prior Publication Data

US 2022/0067876 A1    Mar. 3, 2022

Related U.S. Application Data

(60) Provisional application No. 63/070,254, filed on Aug. 25, 2020.

(51) Int. Cl.
| | |
|---|---|
| *G06F 12/0897* | (2016.01) |
| *G06T 1/60* | (2006.01) |
| *G06F 12/0877* | (2016.01) |
| *G06F 9/50* | (2006.01) |
| *G06N 20/00* | (2019.01) |
| *G06F 11/34* | (2006.01) |

(Continued)

(52) U.S. Cl.
CPC ............... *G06T 1/60* (2013.01); *G06F 9/505* (2013.01); *G06F 11/3024* (2013.01); *G06F 11/3495* (2013.01); *G06F 12/0877* (2013.01); *G06F 12/0897* (2013.01); *G06N 20/00* (2019.01); *G06T 1/20* (2013.01); *G06F 2212/1016* (2013.01); *G06F 2212/608* (2013.01); *G06F 2212/6042* (2013.01)

(58) Field of Classification Search
None
See application file for complete search history.

(56) References Cited

U.S. PATENT DOCUMENTS

| | | | |
|---|---|---|---|
| 7,567,252 B2 | 7/2009 | Buck et al. | |
| 7,856,530 B1* | 12/2010 | Mu | G06F 12/0888 711/119 |
| 10,360,717 B1 | 7/2019 | Gierach et al. | |

(Continued)

*Primary Examiner* — Joni Hsu
(74) *Attorney, Agent, or Firm* — Renaissance IP Law Group LLP

(57) ABSTRACT

A method of processing a workload in a graphics processing unit (GPU) may include detecting a work item of the workload in the GPU, determining a cache policy for the work item, and operating at least a portion of a cache memory hierarchy in the GPU for at least a portion of the work item based on the cache policy. The work item may be detected based on information received from an application and/or monitoring one or more performance counters by a driver and/or hardware detection logic. The method may further include monitoring one or more performance counters, wherein the cache policy for the work item may be determined and/or changed based on the one or more performance counters. The cache policy for the work item may be selected based on a runtime learning model.

20 Claims, 10 Drawing Sheets

(51) Int. Cl.
  *G06T 1/20* (2006.01)
  *G06F 11/30* (2006.01)

(56) References Cited

U.S. PATENT DOCUMENTS

| | | |
|---|---|---|
| 10,580,209 B2 | 3/2020 | Shen et al. |
| 10,628,910 B2 | 4/2020 | Bujewski et al. |
| 10,699,369 B2 | 6/2020 | Jasoliya |
| 10,699,475 B1 | 6/2020 | Barczak et al. |
| 10,748,323 B2 | 8/2020 | Gierach et al. |
| 2011/0078381 A1* | 3/2011 | Heinrich ............. G06F 12/0897 711/E12.024 |
| 2014/0156909 A1* | 6/2014 | Farhan ................ G06F 12/0871 711/103 |
| 2015/0235338 A1* | 8/2015 | Alla .................... G06F 11/0793 345/522 |
| 2016/0147587 A1* | 5/2016 | An ....................... G06F 11/079 714/37 |
| 2016/0350232 A1* | 12/2016 | Knies ................. G06F 12/0891 |
| 2017/0006130 A1* | 1/2017 | Wouhaybi ............ G06F 11/302 |
| 2018/0307487 A1* | 10/2018 | Maiyuran ............. G06F 9/3887 |
| 2018/0322390 A1 | 11/2018 | Das et al. |
| 2019/0102302 A1* | 4/2019 | Taht .................... G06F 12/0862 |
| 2020/0051206 A1 | 2/2020 | Munkberg et al. |
| 2020/0051309 A1 | 2/2020 | Labbe et al. |
| 2020/0258292 A1 | 8/2020 | Ranganathan et al. |

\* cited by examiner

METHODS AND APPARATUS FOR IMPLEMENTING CACHE POLICIES IN A GRAPHICS PROCESSING UNIT

CROSS-REFERENCE TO RELATED APPLICATION

This application claims priority to, and the benefit of, U.S. Provisional Patent Application Ser. No. 63/070,254 titled "Systems, Methods, and Devices for Pass Aware Cache Allocation" filed Aug. 25, 2020 which is incorporated by reference.

TECHNICAL FIELD

This disclosure relates generally to graphics processing, and more specifically to methods and apparatus for implementing cache policies in a graphics processing unit.

BACKGROUND

A memory subsystem in a GPU may be structured as a hierarchy with main memory and various level caches. A cache policy may be applied to the hierarchy to specify cache allocation policies, replacement policies, and/or the like.

The above information disclosed in this Background section is only for enhancement of understanding of the background of the invention and therefore it may contain information that does not constitute prior art.

SUMMARY

A method of processing a workload in a graphics processing unit (GPU) may include detecting a work item of the workload in the GPU, determining a cache policy for the work item, and operating at least a portion of a cache memory hierarchy in the GPU for at least a portion of the work item based on the cache policy. The work item may be detected based on information received from an application. The work item may be detected based on monitoring one or more performance counters. At least one of the one or more performance counters may be monitored by a driver. At least one of the one or more performance counters may be monitored by hardware detection logic. The cache policy may be determined based on a memory request from a client. The memory request may include a work item identifier (ID). The cache policy for the work item may include a static cache policy. The cache policy for the work item may include a dynamic cache policy. The cache policy for the work item may be determined based on an identity of the work item. The identity of the work item may be mapped to the cache policy. The method may further include monitoring one or more performance counters, wherein the cache policy for the work item may be determined based on the one or more performance counters. The cache policy for the work item may be mapped to the one or more performance counters. The method may further include, monitoring one or more performance counters, wherein the cache policy for the work item may be determined based on a combination of an identity of the work item and the one or more performance counters. The method may further include, monitoring one or more performance counters, and changing the cache policy for the work item based on the one or more performance counters. The cache policy may include a first cache policy, the method may further include determining a second cache policy for the work item based on the one or more performance counters, and selecting one of the first or second cache policies for the work item. The cache policy for the work item may be selected based on a runtime learning model.

An apparatus may include a graphics processing pipeline comprising one or more clients, a cache memory hierarchy configured to process memory requests from the one or more clients, and policy selection logic configured to: determine a cache policy for a work item for at least one of the one or more clients, and apply the cache policy to at least a portion of the cache memory hierarchy for at least a portion of the work item. The apparatus may further include detection logic configured to detect the work item. At least a portion of the policy selection logic may be disposed in a central logic unit. At least a portion of the policy selection logic may be disposed in at least one of the one or more clients. At least a portion of the policy selection logic may be disposed in the cache memory hierarchy.

A memory subsystem may include a memory interface, a cache memory hierarchy configured to process memory requests from one or more clients through the memory interface, and policy selection logic configured to: determine a cache policy for a work item for at least one of the one or more clients, and apply the cache policy to at least a portion of the cache memory hierarchy for at least a portion of the work item. The memory subsystem may further include detection logic configured to detect the work item.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

Figure 1:
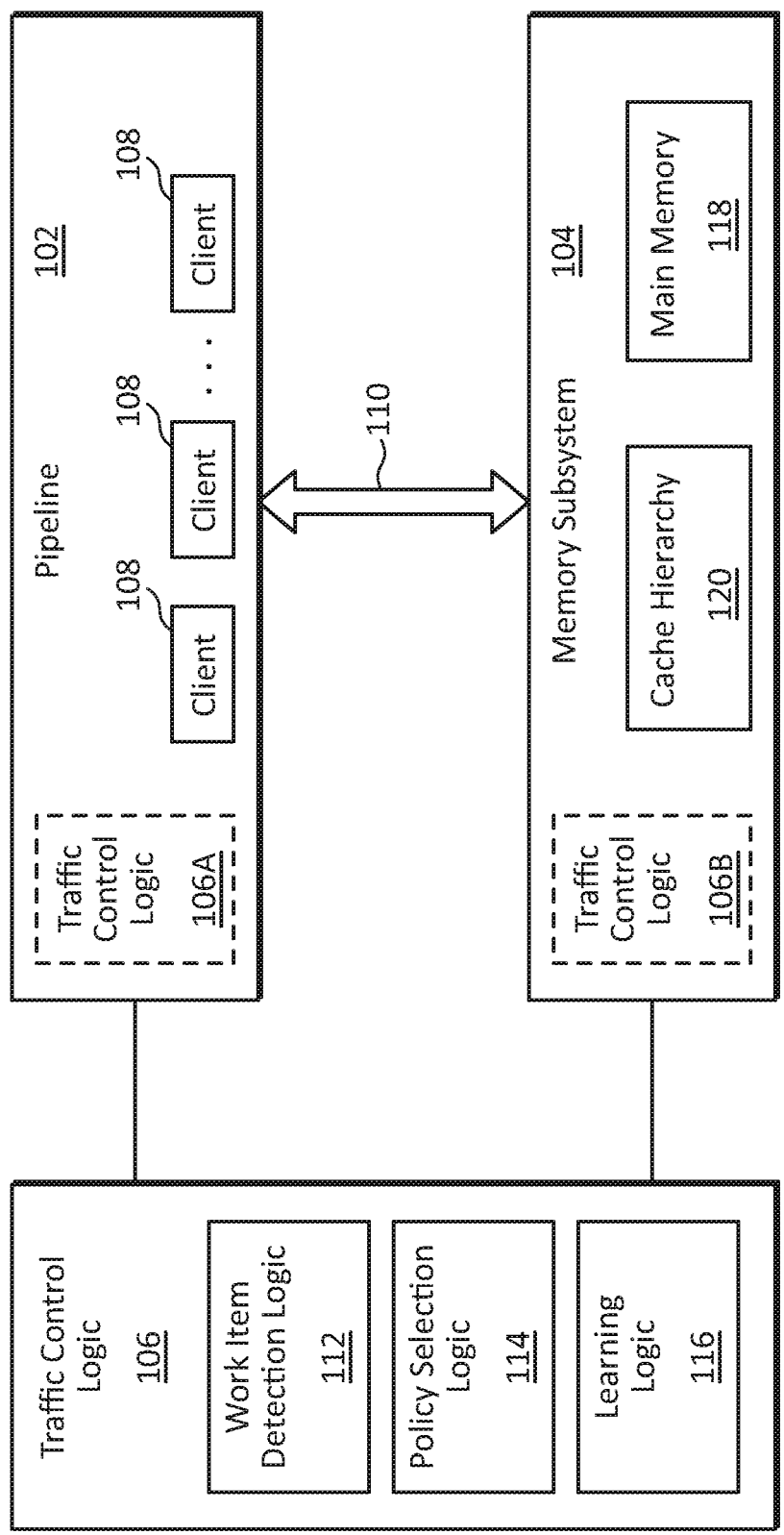
FIG. 1 illustrates an embodiment of a system that may implement work item aware cache polices according to this disclosure.

Some of the principles of this disclosure relate to the use of different cache policies for different work items in a GPU workload. By applying different cache policies based on traffic patterns for different work items, some embodiments may improve performance and/or reduce power consumption, for example, by increasing cache hit rates, increasing effective cache capacity, and/or reducing data movement between various cache levels and/or main memory.

Some principles of this disclosure relate to various methods and apparatus for detecting work items and/or boundaries between different work items. For example, in some embodiments, a work item may be detected by receiving one or more hints from an application and/or a programmer through an application programming interface (API). As additional examples, in various embodiments, a work item or a boundary between successive work items may be detected at a driver level and/or a hardware level by monitoring, and identifying changes in, one or more performance counters that may indicate a change in traffic behavior such as the number of vertices or primitives in a draw, the number of render targets in use, an allocation of memory units, a pipeline state, the numbers and/or types of resources in use, data formats and/or metadata in use, the ratio of vertices to primitives in a draw, the ratio of color and/or depth data accesses to texture accesses, data regions being accessed, cache flushes and/or synchronizations, and/or the like.

Some principles of this disclosure relate to methods and apparatus for implementing various cache policies for different work items. Some embodiments may implement static policies, dynamic policies, and/or hybrid combinations of policies. For example, a static cache policy may be implemented for a work item based on identifying the work item and/or its characteristics. A static policy may be determined, for example, using offline learning of traffic patterns for various work items, and mapping work items to cache policies that may be optimized for specific work items.

As another example, a dynamic policy may be implemented using a runtime learning algorithm. For example, various cache policies may be applied to a work item at runtime, and the resulting performance may be monitored to provide feedback on the effectiveness of each policy. An effective or optimal policy may then be selected and applied for the duration of the work item. Alternatively, the performance of the selected policy may continue to be monitored, and the policy may be modified based on detected changes in the effectiveness of the policy.

As a further example, a dynamic policy may be implemented based on a hybrid combination of offline learning and performance counters such as frames per second (FPS), hit ratios, and/or the like. For example, offline learning may be used to determine multiple cache policies for a work item, wherein each cache policy may be effective or optimal for a different set of performance counters. At runtime, a cache policy may be selected based on the combination of the identity of the work item and the current performance counters.

The principles disclosed herein have independent utility and may be embodied individually, and not every embodiment may utilize every principle. Moreover, the principles may also be embodied in various combinations, some of which may amplify the benefits of the individual principles in a synergistic manner.

Workloads and Cache Policies

A GPU may include a pipeline having various components or stages such as command processors, rasterizers, shaders, texture units, and/or the like. To perform their functions, these components may access a memory subsystem which may include, for example, a main memory and a cache memory hierarchy having one or more levels. A GPU workload may include various sub-passes through one or more of the components to perform graphics processing operations. Different sub-passes may have different runtime traffic patterns (also referred to as traffic behavior) for different types of data such as color, depth, texture, and/or the like. These traffic patterns may change between different rendering sub-passes, each of which may perform a different task in the rendering pipeline such as producing geometry and/or lighting, applying post-processing effects, and/or the like.

An optimal cache policy may depend on the traffic pattern of a sub-pass accessing the cache hierarchy. However, since the traffic patterns of individual rendering sub-passes may be substantially different from each other, a cache policy that may work well for one sub-pass may be detrimental for other sub-passes. Since a GPU workload may include multiple sub-passes having different traffic patterns, the GPU may implement a cache policy that makes tradeoffs to provide the best overall performance for the entire workload. However, this may result in significantly reduced performance for some of the sub-passes.

Work Item Aware Cache Policies

FIG. 1 illustrates an embodiment of a system that may implement work item aware cache polices according to this disclosure. The system illustrated in FIG. 1 may include a graphics processing pipeline 102, a memory subsystem 104, and traffic control logic 106. The pipeline 102 may include any type and/or number of clients 108 that may access the memory subsystem 104 through memory requests 110. Examples of clients 108 may include command processors, geometry units, rasterizers, shaders, texture units, render buffers (e.g., color buffers, depth buffers, and/or the like), attribute fetchers, and/or any other pipeline sub-blocks and/or the like. In some embodiments, a client may include any entity, including resources within a client, that may access the memory subsystem 104.

The memory subsystem 104 may include one or more main memories 118, and one or more cache memory hierarchies (also referred to as cache hierarchies) 120, each of which may include any type and/or number of cache memories. For example, in some embodiments, the memory subsystem 104 may include a cache hierarchy having a single cache, while in other embodiments, a cache hierarchy may have one or more Level 1 (L1), Level 2 (L2), and/or Level 3 (L3) caches. In some embodiments, one or more main memories may be considered part of the cache memory hierarchy.

The traffic control logic 106 may include functionality to exploit spatial and/or temporal locality in cache traffic patterns to implement different cache policies (e.g., allocation policies, replacement policies, shareability, and/or the like) for different work items executed by the pipeline 102. Examples of work items may include passes, sub-passes, phases, and/or the like, and/or any portion thereof. In some embodiments, a work item may include any delineation of time and/or processing having a memory traffic characteristic that may benefit from a specific cache policy.

In some embodiments, the control logic 106 may include work item detection logic 112, policy selection logic 114 and/or learning logic 116. The work item detection logic 112 may include functionality to detect work items and/or boundaries between different work items. (In some embodiments, detecting work items and/or detecting boundaries between different work items may be referred to collectively as detecting work items.) The work item detection logic 112 may operate at an API level, a driver level, a hardware level, and/or any combination thereof.

The policy selection logic 114 may include functionality to select and/or implement one or more cache policies for one or more clients in the pipeline 102 and one or more cache hierarchies, or portions thereof, in the memory subsystem 104. In some embodiments, cache policies may be static, dynamic, and/or any combination thereof. In some embodiments, cache policies may be implemented based on client information and/or characteristics, work item information and/or characteristics, performance counters, learned characteristics and/or behaviors thereof, and/or any combination thereof.

The learning logic 116 may include functionality to monitor and/or learn characteristics, traffic patterns, and/or the like, of work items and/or their performance, which may include open and/or closed loop monitoring, in some cases based on applied cache policies. Learning algorithms may be implemented online, offline, and/or any combination thereof.

In some embodiments, the traffic control functionality may be implemented in a centralized manner, for example, mostly or entirely within traffic control logic 106. In other embodiments, some or all of the traffic control logic 106 may be implemented in a distributed manner including being distributed throughout one or more other components as shown in dashed lines as traffic control logic 106A and 106B located in the pipeline 102 (and/or components thereof) and/or memory subsystem 104 (and/or components thereof), respectively. Thus, some or all of the work item detection logic 112, policy selection logic 114 and/or learning logic 116 may also be distributed throughout the system, including throughout other components of the system.

The traffic control logic 106 may be implemented with hardware, software, or any combination thereof. For example, in some embodiments that may be implemented at least partially with hardware, the control logic may include circuitry such as combinational logic, sequential logic, one or more timers, counters, registers, state machines, volatile memory such as dynamic random access memory (DRAM) and/or static dynamic access memory (SRAM), nonvolatile memory such as flash memory, complex programmable logic devices (CPLDs), field programmable gate arrays (FPGAs), application specific integrated circuits (ASICs), complex instruction set computer (CISC) and/or reduced instruction set computer (RISC) processors executing instructions, and/or the like, to perform their respective functions. Although illustrated as individual components, in some embodiments, the work item detection logic 112, policy selection logic 114 and/or learning logic 116 may be integrated into single components, and/or some components shown as single components may be implemented with multiple components. For example, in some embodiments, the learning logic 116 may be integrated into the policy selection logic 114.

For purposes of illustrating the principles of this disclosure, some example embodiments may be described below in the context of some specific implementation details. The inventive principles, however, are not limited to these example details.

For convenience throughout this disclosure, a work item may refer to both an entire work item and/or a portion of a work item. Similarly, a work item may refer to both a work item and/or a boundary between work items. Also for convenience, a hierarchy may refer to both an entire hierarchy and/or a portion of a hierarchy.

Figure 2:
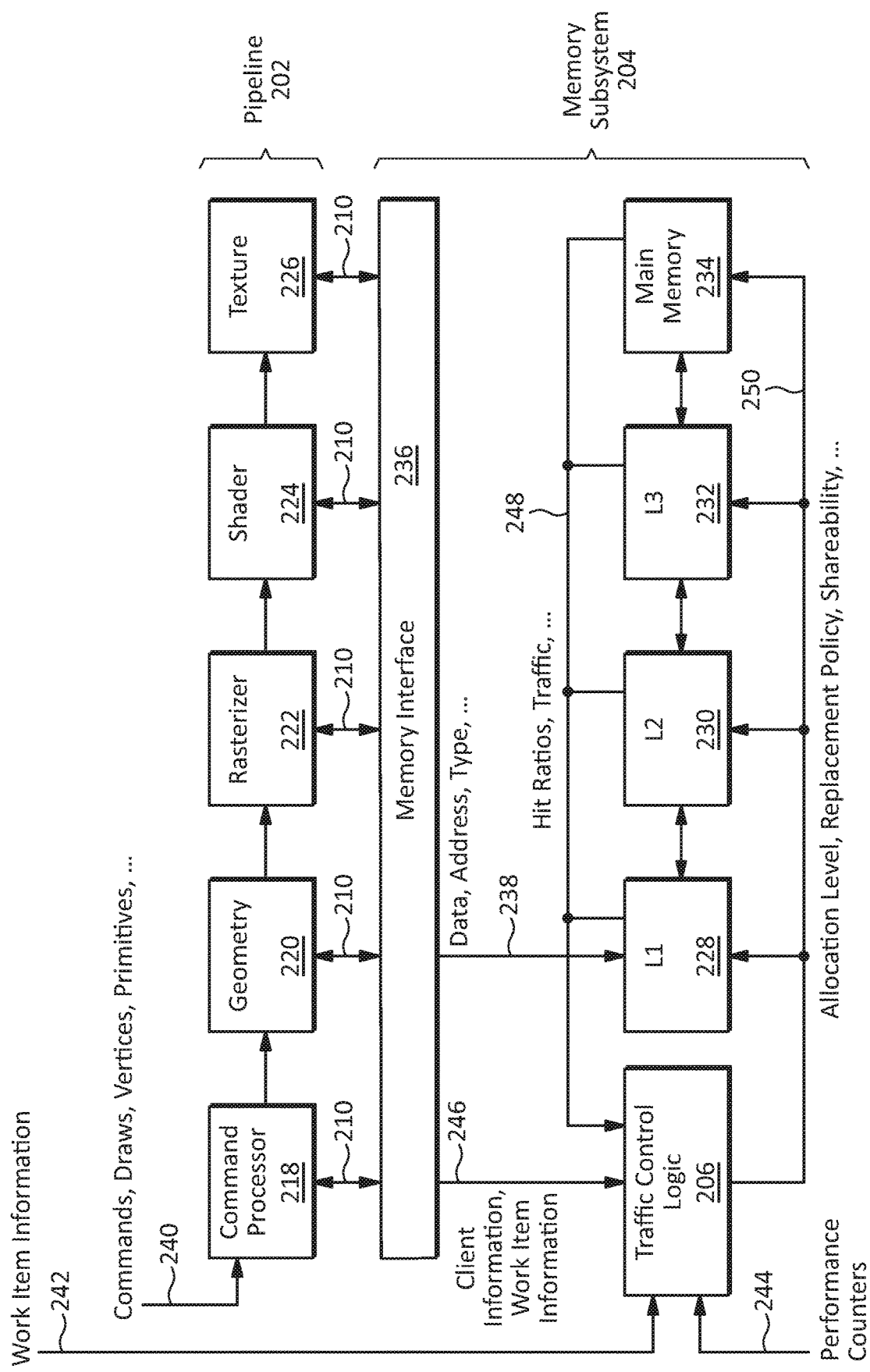
FIG. 2 illustrates an example embodiment of a system that may implement work item aware cache polices according to this disclosure.

FIG. 2 illustrates an example embodiment of a system that may implement work item aware cache polices according to this disclosure. The system illustrated in FIG. 2 may include a graphics processing pipeline 202, a memory subsystem 204, and traffic control logic 206. For purposes of illustration, the pipeline 202 is shown with a series of clients in the form of sub-blocks including a command processor 218, a geometry unit 220, a rasterizer 222, one or more shaders 224, and a texture unit 226 which may access the memory subsystem 204 through memory requests 210, but other embodiments may have any other number and/or types of clients.

Also for purposes of illustration, the memory subsystem 204 is shown with a cache hierarchy having an L1 cache 228, an L2 cache 230, and an L3 cache 232, as well as a main memory 234, and a memory interface 236, but other embodiments may have any other number and/or types of components. In some embodiments, the memory interface may include one or more buses, arbiters, and/or the like. Memory for the memory requests 210 may be located in the main memory 234 and/or the L1, L2, and/or L3 caches and accessed using data, address type, and/or other information 238.

In some embodiments, the traffic control logic 206 may include work item detection logic, policy selection logic, and/or learning logic. In some embodiments, the traffic control logic 206 may be implemented in a centralized manner as illustrated in FIG. 2, but in other embodiments, some or all of the traffic control logic 206 may be distributed throughout the system. For example, in some embodiments, work-item aware traffic logic may be implemented in one or more of the sub-blocks to enable a sub-block to make its own policy decisions. In such an embodiment, a sub-block may select a cache policy and sent it along with a memory request to the memory subsystem 204. The memory request may further include a work item identifier (ID) that may be used by the memory subsystem 204 to set the policy for the work item or portion thereof. As another example, in some embodiments, work-item aware traffic logic may be implemented in one or more of the L1, L2, and/or L3 caches, for example, as a localized state machine.

A software driver may provide input 240 such as commands, draws, vertices, primitives, and/or the like to the pipeline 202. The driver may also provide work item information 242 to the traffic control logic 206. In some embodiments, the work item information may include a work item ID, memory characteristics of the work item (e.g., characteristics that may indicate the traffic behavior expected from the work item), and/or the like.

The traffic control logic 206 may also receive and monitor performance counters 244 which may be implemented, for example, at the software driver and/or hardware level. The traffic control logic 206 may receive and monitor additional performance counters 248 such as hit ratios, traffic patterns, and/or the like, from any or all of the L1, L2, and/or L3 caches and/or main memory 234. Additional information 246 such as client information, work item information, and/or the like may be passed to the traffic control logic 206 through the memory interface 236.

The traffic control logic 206 may apply one or more cache policies 250 to the cache hierarchy for one or more work items and/or portions thereof, for example, by sending one or more allocation levels, replacement policies, shareability policies, and/or the like, to L1. L2, and/or L3 caches and/or main memory 234.

In some embodiments, the systems illustrated in FIGS. 1 and 2 may enable the implementation of work item aware policies that may increase performance and/or reduce power consumption, for example, by increasing cache hit rates and/or effective cache capacity, and/or by reducing data movement between various levels of the cache hierarchy as well as main memory. Depending on the implementation details, power consumption may be reduced in a GPU core memory hierarchy, as well as a memory interconnect and/or main memory and associated caches. In some implementations, the power reduction may extend to a Lowest (or Last) Level Cache (LLC), which may be, for example, one level above the GPU and/or other components such as multimedia blocks. In some embodiments, one or more of the systems and/or methods disclosed herein may be implemented with little or no modification to an application and/or driver.

The traffic control logic 206 may be implemented with hardware, software, or any combination thereof as described above with respect to the embodiments illustrated in FIGS. 1 and 2.

The operations, components, connections, data flow, and/or the like described with respect to the embodiment illustrated in FIG. 2 as well as any other embodiments described herein, are example operations, components, connections, data flow, and/or the like. In some embodiments, some of these elements may be omitted and/or other elements may be included. In some embodiments, the temporal and/or spatial order of the operations, components, connections, data flow, and/or the like may be varied. Moreover, in some embodiments, multiple operations, components, connections, data flow, and/or the like may be combined into single elements, and/or single operations, components, connections, data flow, and/or the like may be distributed among multiple elements.

Runtime Operations

Figure 3:
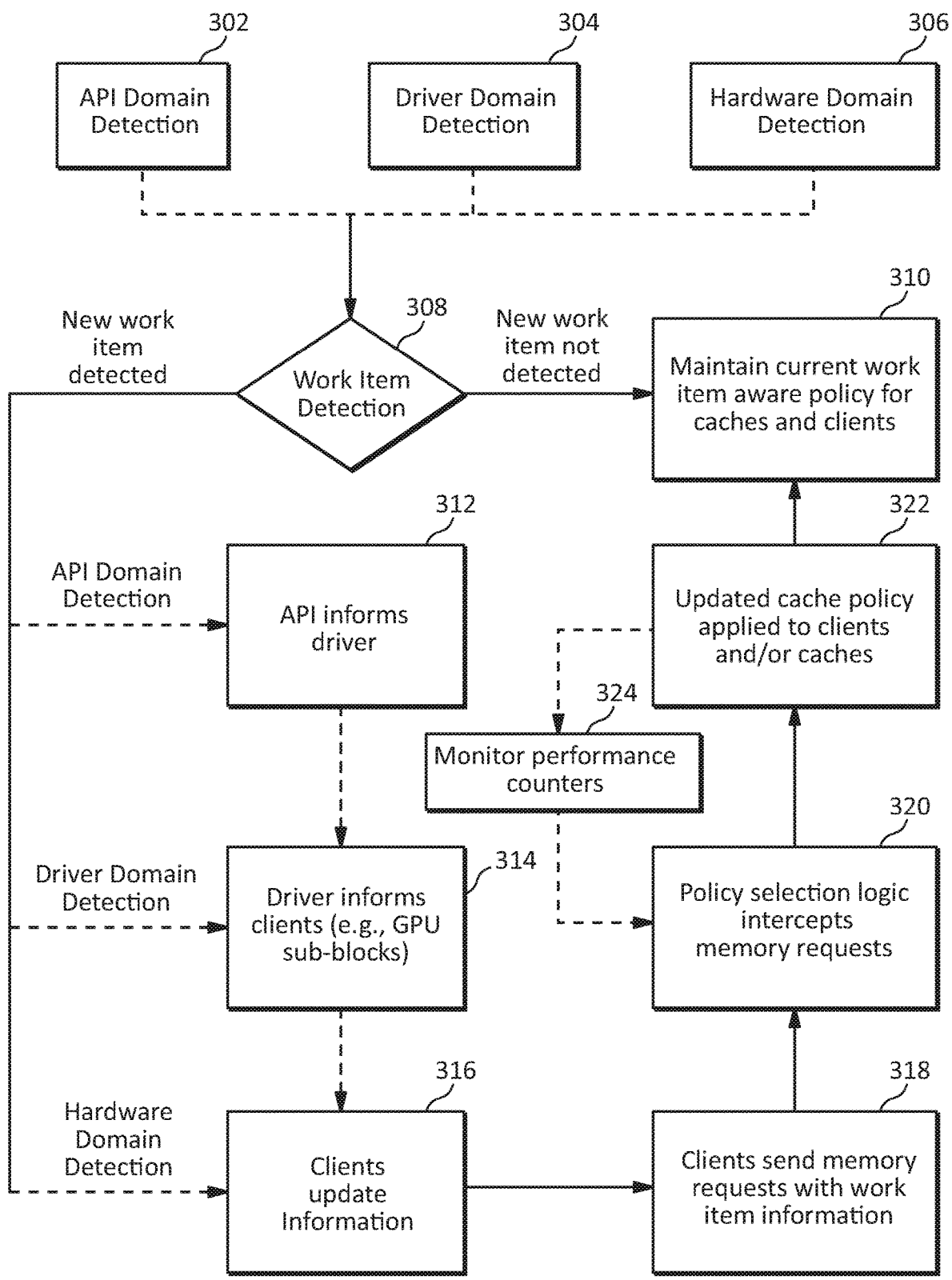
FIG. 3 illustrates an example embodiment of a method for implementing work item aware cache policies according to this disclosure.

FIG. 3 illustrates an example embodiment of a method for implementing work item aware cache policies according to this disclosure. The method illustrated in FIG. 3 may be implemented, for example, using a system such as the system illustrated in FIGS. 1 and 2, although the method illustrated in FIG. 3 is not limited to any of the specific details described in FIGS. 1 and 2.

A new work item and/or boundary (which may be referred to collectively as a work item) may be detected at an API detection operation 302, a software driver detection operation 304, a hardware detection operation 306, and/or a combination thereof. If a new work item is not detected at operation 308, the cache hierarchy may continue using the current work item aware cache policy at operation 310.

If a new work item is detected at operation 308, the path taken may depend on how the work item was detected. For example, if the new work item was detected by the API operation 302, the method may proceed to operation 312 where the API may inform the software driver of the new work item and proceed to operation 314. If the new work item was detected by the software driver operation 304, the method may skip operation 312 and proceed to operation 314 where the driver may inform one or more clients (e.g., texture unit, shader, rasterizer, and/or the like) of the new work item and proceed to operation 316. If the new work item was detected by the hardware operation 306, the method may skip operations 312 and 314 and proceed to operation 316 where one or more clients may update work item information such as a work item ID, memory characteristics of the work item, and/or the like.

The method may then proceed to operation 318 where one or more clients involved in the work item may send one or more memory requests that may include the work item information to a memory subsystem. At operation 320, work item aware policy selection logic may intercept some or all memory requests, for example, those relating to the clients involved in the new work item. At operation 322, an updated cache policy for the new work item may be applied to one or more clients and one or more caches, for example, those involved with the new work item.

In some embodiments, the method may then proceed to operation 310 where the cache hierarchy may continue using the current work item aware cache policy for the duration of the work item. In some other embodiments, the method may loop through operation 324 where one or more performance counters may be monitored. The current cache policy may then be updated based on the performance counters. In some embodiments, the method may loop through operation 324 a limited number of times, for example, until a traffic pattern of the work item is determined, and an appropriate cache policy is applied to the cache hierarchy. In other embodiments, the method may continue looping through operation 324 for the duration of the work item to continuously adjust the cache policy based on changing traffic patterns determined by monitoring the performance counters.

The operations, components, connections, data flow, and/or the like described with respect to the embodiment illustrated in FIG. 3 as well as any other embodiments described herein, are example operations, components, connections, data flow, and/or the like. In some embodiments, some of these elements may be omitted and/or other elements may be included. In some embodiments, the temporal and/or spatial order of the operations, components, connections, data flow, and/or the like may be varied. Moreover, in some embodiments, multiple operations, components, connections, data flow, and/or the like may be combined into single elements, and/or single operations, components, connections, data flow, and/or the like may be distributed among multiple elements.

Work Item Detection

Work items may be detected according to this disclosure in different domains including the API domain, the driver domain, the hardware domain, and/or the like, or a combination thereof. The work item detection techniques described herein may be implemented, for example, with any of the systems and/or methods illustrated in FIGS. 1-3, although the techniques are not limited to any of the specific details described in FIGS. 1-3.

At the application level, various techniques according to this disclosure may be used to enable a programmer or application to directly and/or indirectly notify traffic control logic about a new work item. For example, in some embodiments, an API may include, and/or implement one or more extensions to provide, functionality to explicitly inform traffic control logic about a work item, and to provide information that may enable the traffic control logic to select and/or maintain a cache policy appropriate for the work item. In some implementations, this information may be passed to the traffic control logic through a driver.

As another example, a programmer or application may indirectly inform traffic control logic about a work item by providing hints. For example, some APIs may provide an open memory system that may enable hardware vendors to implement different memory types that may provide optimal memory locations based on usage. Thus, a programmer may distinguish between work items by allocating different memory types per work item. In some embodiments, this may enable memory transactions and/or associated cache policies to be tuned for improved performance based on the type and/or property of the work item.

In some embodiments, and depending on the implementation details, identifying work items in the API domain may provide a programmer or application more transparency and/or flexibility in terms of improving the work item's performance. Moreover, identifying work items at the API level may improve accuracy because the identification may be performed by a programmer rather than a machine and/or algorithm attempting to infer second-order effects of a work item's behavior.

At the driver level, various techniques (e.g., heuristics) according to this disclosure may be used to detect a new work item, for example by monitoring one or more performance counters such as the state of a pipeline, the number and/or type of dimensions, the number of draws being processed, the number of vertices and/or primitives in a draw, the number of render targets in use, the number and/or types of resources in use (e.g., allocations of memory units or "blobs") resource transitions, data formats in use, shader metadata, and/or the like.

For example, in some embodiments, once a potential work item and/or memory unit within a work item has been identified as a candidate for a work item aware cache policy, a GPU driver may attempt to set an appropriate hint for the traffic control logic. In some embodiments, a GPU driver may be able to determine when a memory unit may be used as a presentable image. This detection may occur at the creation of such an image, and therefore the GPU driver may have an opportunity to set an appropriate memory type to indicate a new work item. For example, this memory type may be set when the GPU driver imports (e.g., takes ownership of) externally allocated memory. Allocated regions of memory may be mapped with a memory type which may inform hardware of specific ways in which the driver expects a particular memory region to be handled.

At the hardware level, various techniques (e.g., heuristics) according to this disclosure may be used to detect a new work item, for example, by monitoring one or more performance counters such as cache flushes and/or cache synchronizations, the number of render targets in use, the ratio of vertices to primitives, the ratio of color and/or depth data accesses to texture accesses, data regions being accessed, traffic to regions that have not been utilized in the current work item, and/or the like. These and/or other parameters may be used at various times to infer the existence and/or identity of a work item and/or a boundary between consecutive work items.

In some embodiments, and depending on the implementation details, identifying work items in the hardware domain may involve little or no software support.

In some embodiments, a purpose of detecting a work item may be to allow the traffic control logic to find the start points (and, subsequently, end points) of one or more work items. In some embodiments, the actual identity and/or type of a work item (such as a geometry buffer sub-pass, a lighting sub-pass, and/or the like) may not be a primary factor in determining a cache policy for a new work item. For example, in some implementations, a cache policy may be determined based on learning the memory traffic behavior for a work item, rather than knowing the identity of the work item. In other embodiments, however, a cache policy for a new work item may be based partially or entirely, the identity or type In cases where the characteristics of a work item may remain the same across workloads, a static policy may be applied for that work item. For example, transfers to the display frame buffer may be more explicitly optimized.

In some embodiments, after one or more work items have been identified, one or more clients such as GPU sub-blocks and/or cache hierarchy elements may be informed when there is a change in the work item being executed by the GPU. This notification may be implemented with a mechanism that may vary based on a work item identification mechanism. Moreover, after one or more clients and/or cache hierarchy elements are notified of a new work item being executed by the GPU, they may reassess their respective cache policies to evaluate if they could be using a more optimal policy for the new work item. For example, if an L2 cache is notified of a change in the work item, work item aware policy logic in the L2 cache may evaluate if the cache replacement policy that was used for the previous work item is acceptable or optimal for the new work item. No action may be taken by L2 cache if the policy used for the previous work item is found to be acceptable or optimal for new work item as well. However, if the work item aware policy logic in the L2 cache identifies a more optimal replacement policy for the new work item, the L2 cache may apply a new replacement policy to better suit the new work item.

In some embodiments, the work item aware policy logic may use different evaluation mechanisms to identify an acceptable or optimal policy for a work item according to this disclosure, including any of the examples described below.

Learning Traffic Behavior

In some embodiments according to this disclosure, learning of cache memory traffic behavior for a work item may be implemented in any domain including the driver level, the hardware level, and/or any combination thereof. The traffic behavior learning techniques described herein may be implemented, for example, with any of the systems and/or methods illustrated in FIGS. 1-3, although the techniques are not limited to any of the specific details described in FIGS. 1-3.

In some embodiments, traffic behavior may be learned using offline analysis which may enable traffic control logic to apply a policy that may be beneficial or optimal for a particular work item. For example, in the context of a display frame buffer optimization, one or more of the following characteristics and/or performance counters may be analyzed offline: re-use of producer (data writer) and/or consumer (data reader) relations across (between) and/or within clients' no-allocate lines; read and/or write traffic per client; partial writes; memory types; and/or the like.

In some embodiments, one or more of these characteristics may be monitored by performance counters which may be implemented, for example, in hardware, one or more software drivers, and/or the like. Additionally, monitoring of performance counters may be used for work item detection.

In some situations, the total number of work items such as sub-passes within a frame may remain invariant. Some embodiments may implement one or more checks for this situation because it may be used to detect final sub-frame writes. Upon detecting that the number of sub-passes has changed, a learning algorithm according to this disclosure may potentially restart and/or erase all prior learning, or save the prior learning for later use, for example, upon detecting a return to the previous behavior.

In some embodiments, learning of traffic behavior for a work item may take place over a portion of a frame, an entire frame, and/or multiple frames. The characteristics of each work item within the frame may be tracked, and once one or more characteristics of the work item have been learned, the learned characteristics may be used to determine and apply improved or optimum cache polices such as allocation policies, replacement policies, and/or the like on the same work items of future frames.

Work Item Aware Traffic Controller

Figure 4:
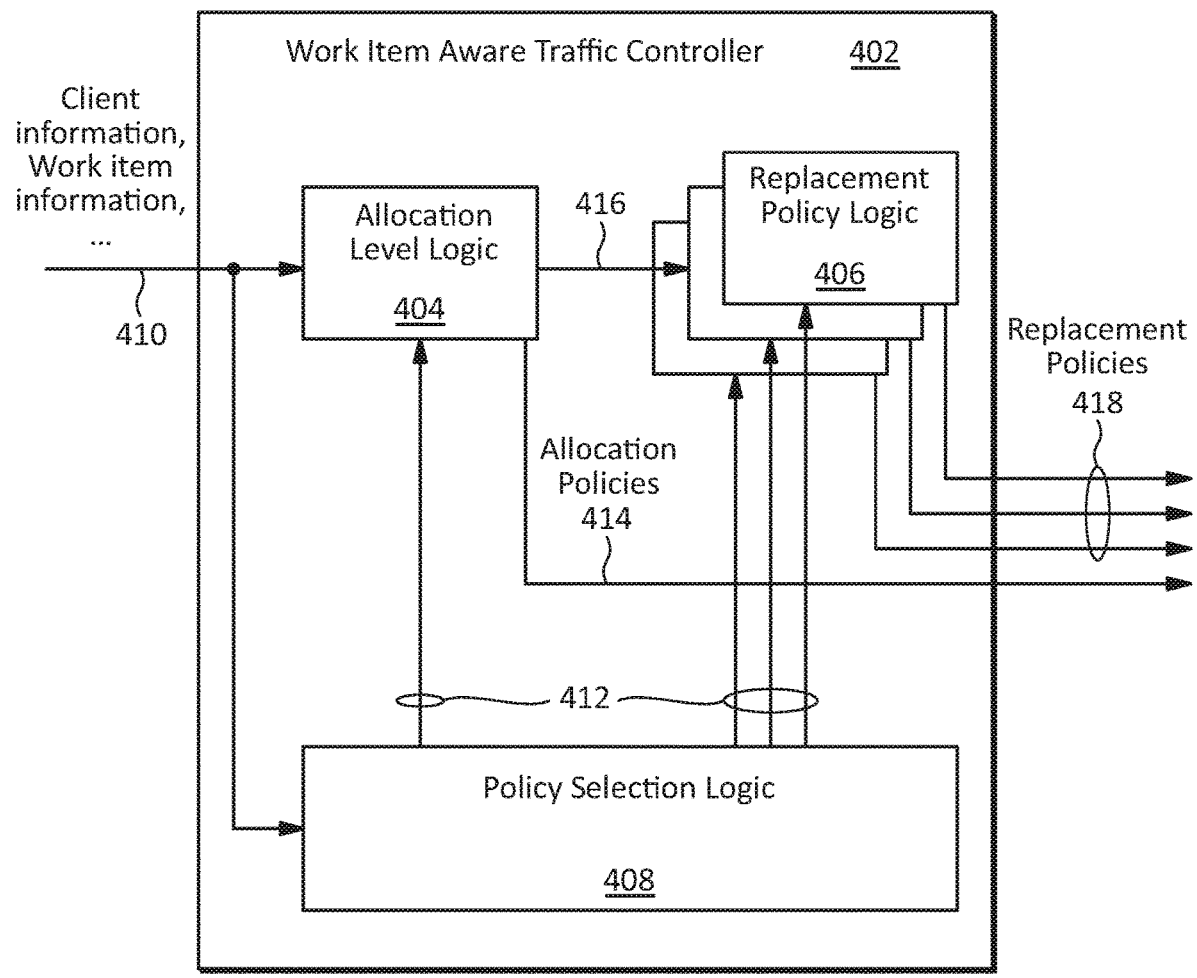
FIG. 4 illustrates an example embodiment of a work item aware traffic controller according to this disclosure.

FIG. 4 illustrates an example embodiment of a work item aware traffic controller according to this disclosure. The controller illustrated in FIG. 4 may be used, for example, to implement any of the traffic control logic disclosed herein, including the traffic control logic illustrated in FIGS. 1 and 2. The controller 402 may include allocation level logic 404, replacement policy logic 406 and policy selection logic 408. The policy selection logic 408 may select one or more cache policies using any of the policy selection techniques disclosed herein in response to inputs 410 from any of a wide variety of sources. For example, the inputs 410 may include client information and/or work item information as shown in FIG. 4 and which may be received, for example, from a memory, a driver, an API, and/or the like. Additionally, or alternatively, the inputs 410 may include any other information including performance counters such as hit ratios, frames per second, and/or the like.

The one more cache policies 412 selected by the policy selection logic 408 may be communicated to the allocation level logic 404 and/or replacement policy logic 406 for implementation. The allocation level logic 404 may provide an allocation policy 414 in response to one or more of the inputs 410 and the one or more cache policies 412 selected by the policy selection logic 408. The embodiment illustrated in FIG. 4 may include three instances of the replacement policy logic 406 to provide a separate replacement policy per cache level in a cache hierarchy, but other embodiments may include only one, or any other number of instances of replacement policy logic 406. Likewise, other embodiments may include any number of instances of allocation level logic 404.

The replacement policy logic 406 may provide replacement policies 418 in response to the one more cache policies 412 selected by the policy selection logic 408 and an output 416 from the allocation level logic 404, which may include, for example, the allocation policy 414 and/or one or more of the inputs 410.

In some embodiments, the traffic controller 402 may intercept some or all memory requests, for example, from a memory interface, and use one or more properties from each request such as a client identifier (client ID), work item ID, read and/or write indicator, and/or the like, to assign one or more cache policies, for example, on a per request basis, which may also be implemented on a per-level basis in a cache hierarchy. Examples of elements of caching policies that may be assigned on a per-level basis include whether a request is cacheable or uncacheable, retention age, replacement policy, and/or the like. In some embodiments, the traffic controller 402 may map a work item ID token and/or other request properties to a selected cache policy and assign the policy to the request.

Policy Selection Logic

Various methods may be used to select and/or apply one or more cache policies for a work item according to this disclosure. Examples of methods include a static policy selection per work item based on offline learning, dynamic policy selection based on runtime conditions and offline learning, and/or dynamic policy selection based on runtime conditions and runtime learning. In some embodiments, one or more cache polices may be optimized for different output characteristics. For example, one or more policies may be optimized to maximize FPS, reduce memory traffic, and/or the like. In some embodiments, a policy may be considered optimal if it may provide the best, or nearly best, result for one or more parameters that may be relevant to a specific work item to which it may be applied. In some embodiments, a cache policy may be considered static if it does not change for the duration of a work item, or portion thereof, for which it may be applied, whereas a cache policy may be considered dynamic if changes, or is capable of changing, during the duration of a work item, or portion thereof, for which it may be applied. These are merely example techniques, and other techniques and/or combinations thereof, may be implemented in accordance with the principles of this disclosure. The policy selection techniques described herein may be implemented, for example, with any of the systems and/or methods illustrated in FIGS. 1-3, although the techniques are not limited to any of the specific details described in those figures. As mentioned above, for convenience throughout this disclosure, a work item may refer to an entire work item and/or a portion of a work item, a work item may refer to a work item and/or a boundary between work items, and a hierarchy may refer to an entire hierarchy and/or a portion of a hierarchy. Similarly, optimal may refer to something that may be less than optimal but still effective, beneficial, improved, and/or the like.

Figure 5:
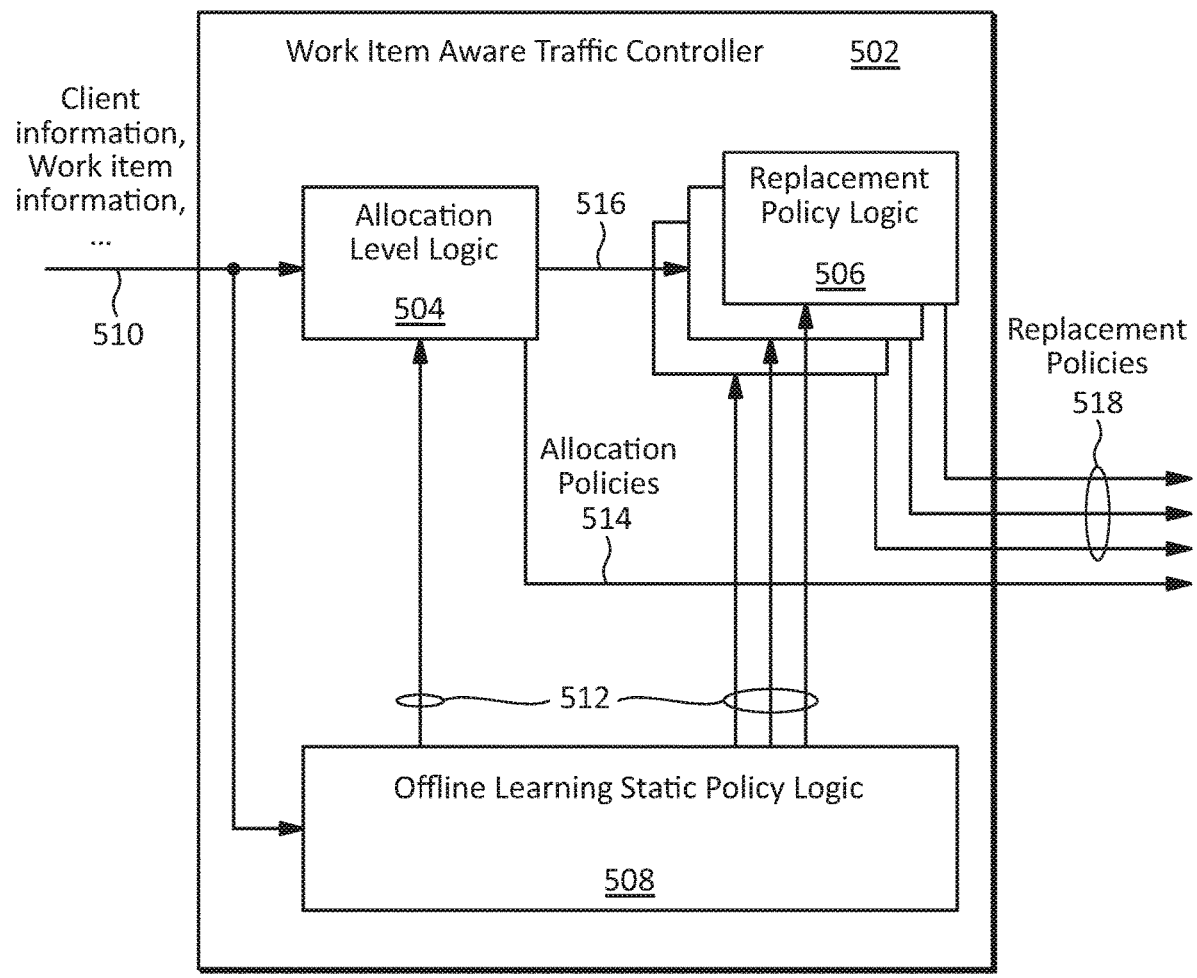
FIG. 5 illustrates an example embodiment of a work item aware traffic controller that may implement static policy selection based on offline learning according to this disclosure.

FIG. 5 illustrates an example embodiment of a work item aware traffic controller 502 that may implement static policy selection based on offline learning according to this disclosure. The controller 502 may include allocation level logic 504 and replacement policy logic 506 that may be similar to those in the embodiment illustrated in FIG. 4. The policy selection logic may be implemented as offline learning static policy logic 508 which may perform profiling and/or analysis of application and/or work item behavior. One or more optimal policies per work item may be identified offline and hardcoded in hardware and/or implemented in a driver or any other arrangement that may apply the one or more policies to a cache hierarchy. For example, work items may be detected at runtime, and their identities may be communicated to one or more of the clients (e.g., hardware sub-blocks) that may be involved in executing the work item. In some embodiments, one or more of the clients, traffic control logic, cache hierarchy, and/or the like, may map the work item identity to one or more corresponding optimal policies.

In some embodiments, and depending on the implementation details, this mechanism may involve few changes to the hardware, and hence, may be relatively easy to implement.

Figure 6:
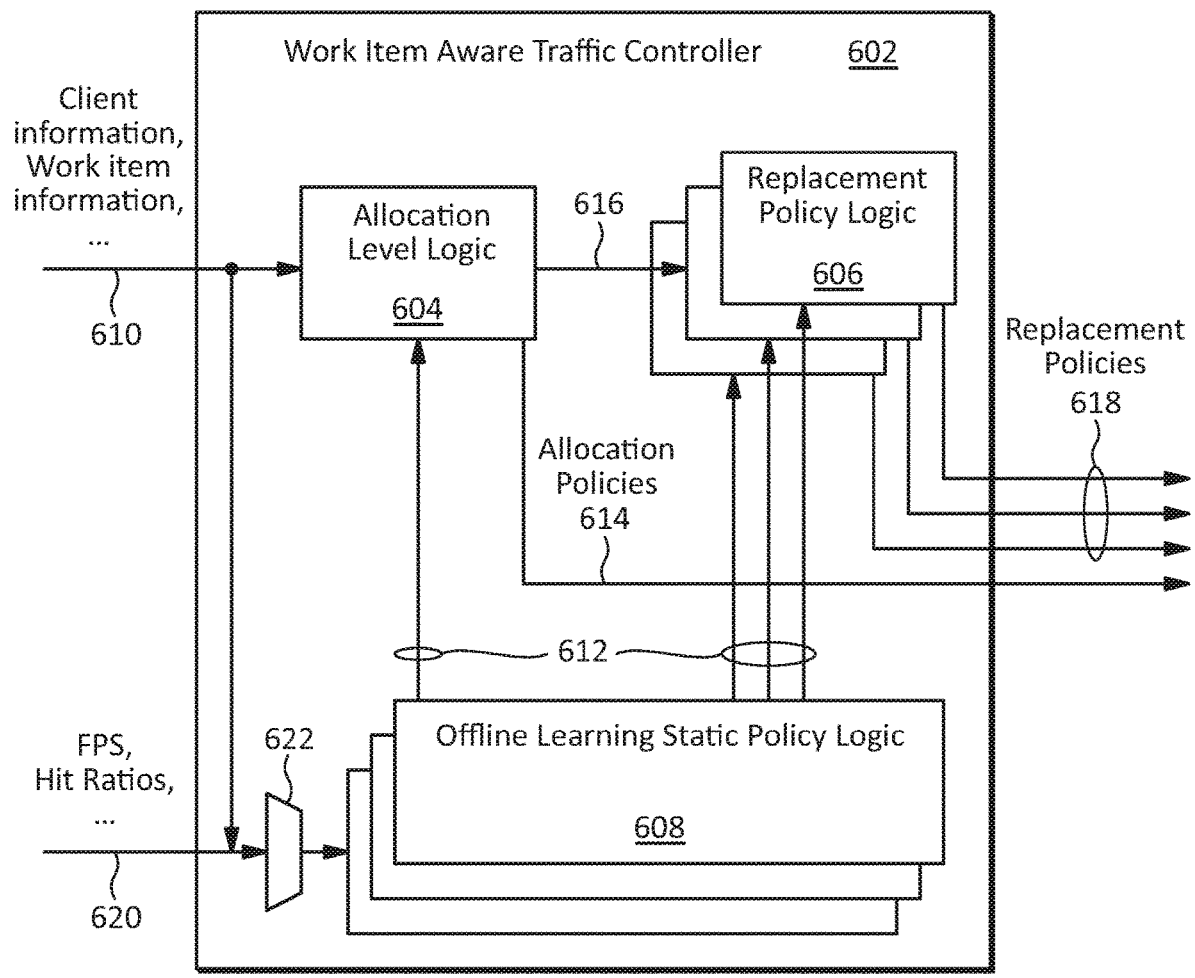
FIG. 6 illustrates an example embodiment of a work item aware traffic controller that may implement dynamic policy selection based on performance counters and offline learning according to this disclosure.

FIG. 6 illustrates an example embodiment of a work item aware traffic controller 602 that may implement dynamic policy selection based on performance counters and offline learning according to this disclosure. The controller 602 may include allocation level logic 604 and replacement policy logic 606 that may be similar to those in the embodiment illustrated in FIG. 4. As with the embodiment of FIG. 5, the policy selection logic may be implemented as offline learning static policy logic 608 which may implement offline profiling and/or analysis of application and/or work item behavior. However, the offline learning static policy logic 608 may identify multiple optimal policies per work item based on performance counters 620 such as FPS, hit ratios, and/or the like, which may be monitored by, and/or input to, offline learning static policy logic 608 through selector 622. The optimal policies may be identified offline and hardcoded in hardware and/or implemented in a driver or any other arrangement that may apply the one or more policies to a cache hierarchy.

In some embodiments, offline learning static policy logic 608 may identify and apply an optimal cache policy at the beginning of a work item and apply that policy for the duration of the work item. In some other embodiments, the offline learning static policy logic 608 may continue to monitor the performance counters and change the cache policy during the execution of the work item in response to one or more changing performance counters.

In some embodiments, one or more learning algorithms may be relatively sophisticated since they may be performed offline and thus may not involve many resource constraints. Based on this offline learning, logic may be hardcoded into work item aware policy hardware, which may receive inputs 610 such as client ID, work item ID, and/or the like, along with various performance counters such as FPS, hit ratios for various caches, and/or the like. Based on these inputs, the offline learning static policy logic 608 may select one or more cache policies 612 which may be communicated to the allocation level logic 604 and replacement policy logic 606 for implementation. In some embodiments, work items detected at runtime and their identities may be communicated by one or more clients (e.g., sub-blocks) to the traffic controller along with one or more memory requests.

In some embodiments, and depending on the implementation details, this mechanism may provide more fine-grained and/or fine-tuned policy selection based on the runtime behavior of a particular work item.

Figure 7:
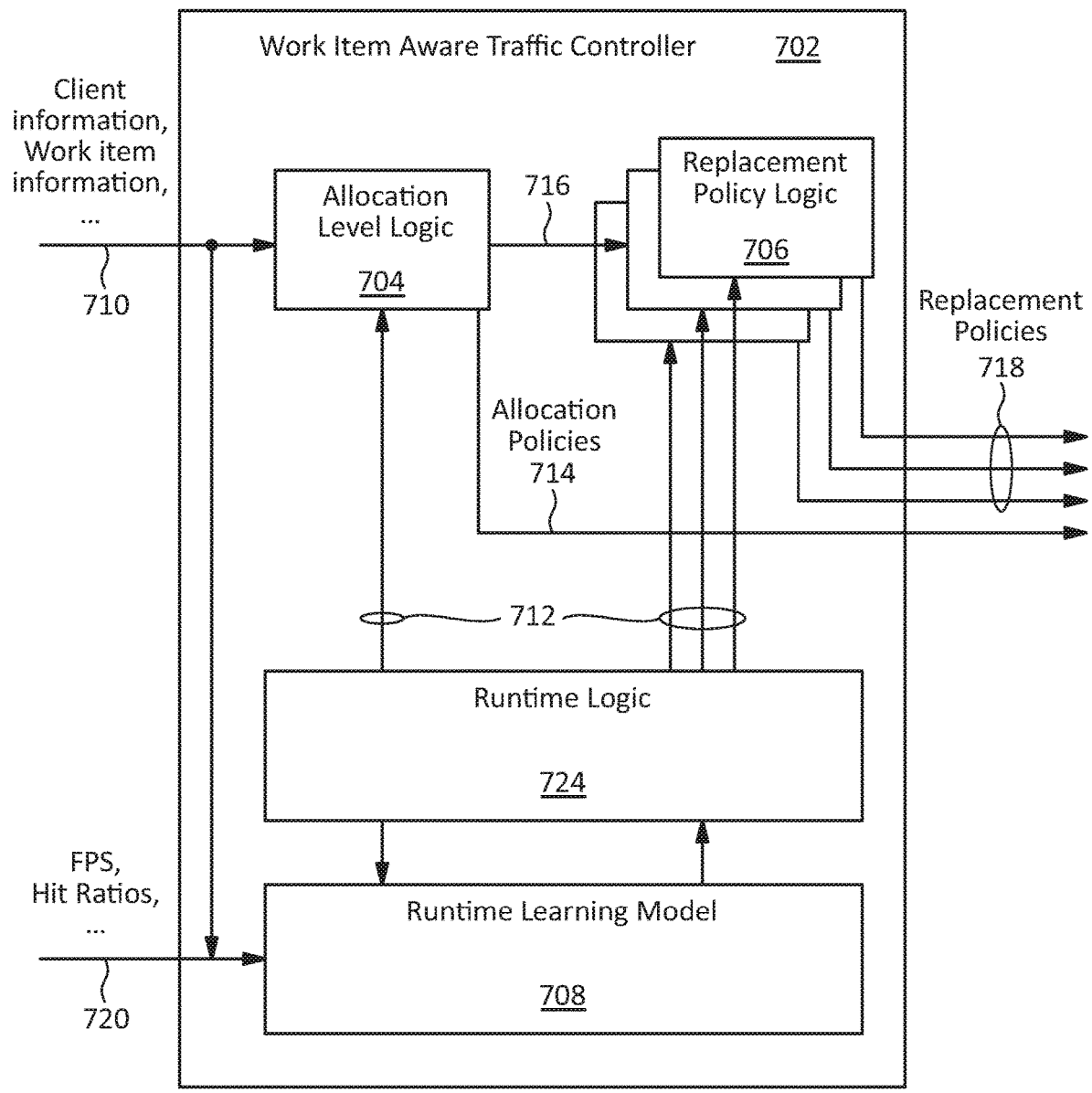
FIG. 7 illustrates an example embodiment of a work item aware traffic controller that may implement dynamic policy selection based on performance counters and online learning according to this disclosure.

FIG. 7 illustrates an example embodiment of a work item aware traffic controller 702 that may implement dynamic policy selection based on performance counters and online learning according to this disclosure. The controller 702 may include allocation level logic 704 and replacement policy logic 706 that may be similar to those in the embodiment illustrated in FIG. 4. However, the policy selection logic may be implemented with one or more runtime learning models 708 and runtime logic 724. Thus, the policy selection logic may perform little or no offline profiling and analysis of the application and/or work item behavior. Instead, the one or more runtime learning models 708 and runtime logic 724 may identify the optimal policies per work item at runtime by sequentially applying multiple available cache policies and using a feedback mechanism to evaluate the effectiveness of each policy and thereby learn one or more optimal policies per work item. In some embodiments, once an optimal policy is learned for a work item, it may be used for the duration of the work item. Alternatively, the one or more runtime learning models 708 and runtime logic 724 may continue to monitor the effectiveness of the applied policy and change the policy in response to one or more changing performance counters. In some embodiments, the one or more runtime learning models 708 may be implemented with regression analysis, fuzzy logic, machine learning, and/or the like.

In some embodiments, one or more learned policies may be saved, for example, in one or more tables in hardware, at the drive level, and/or the like, so any future occurrence of the corresponding work item with similar behavior may take advantage of one or more optimal policies identified during past learning.

In some embodiments, and depending on the implementation details, this method may learn at runtime the effectiveness of a particular policy.

Although the traffic controllers 402, 502, 602, and 702 may be illustrated as single units, their functionality may be distributed among different components as described above with respect to the embodiments illustrated in FIGS. 1 and 2. Moreover, any of the functionality of the traffic controllers may be implemented with hardware, software, and/or a combination thereof as described above with respect to the embodiments illustrated in FIGS. 1 and 2.

The operations, components, connections, data flow, and/or the like described with respect to the embodiments illustrated in FIGS. 4-7 as well as any other embodiments described herein, are example operations, components, connections, data flow, and/or the like. In some embodiments, some of these elements may be omitted and/or other elements may be included. In some embodiments, the temporal and/or spatial order of the operations, components, connections, data flow, and/or the like may be varied. Moreover, in some embodiments, multiple operations, components, connections, data flow, and/or the like may be combined into single elements, and/or single operations, components, connections, data flow, and/or the like may be distributed among multiple elements.

Cache Allocating During Display Writes

In some embodiments, writes to a display frame buffer may allocate cache lines in the LLC, which may result in eviction of lines that may be used by subsequent reads. Consequently, the read-misses in the LLC may result in higher latency and/or increased DRAM traffic. As an example implementation of the techniques disclosed herein, a driver may identify a final work item for these workloads and inform the GPU hardware when a final work item is being executed. As a specific optimization, the GPU hardware, in turn, may choose to not allocate display frame buffer writes in the LLC, which may thereby reduce DRAM traffic, access latency for reads, and cycles required to render the final sub-frame. This technique of selective non-allocation may be implemented, for example, in tile-based architectures, as well as immediate mode renderers where I/O from a local (on-GPU) render targets may be more difficult to classify.

Work Item Aware Cache Policy Method

Figure 8:
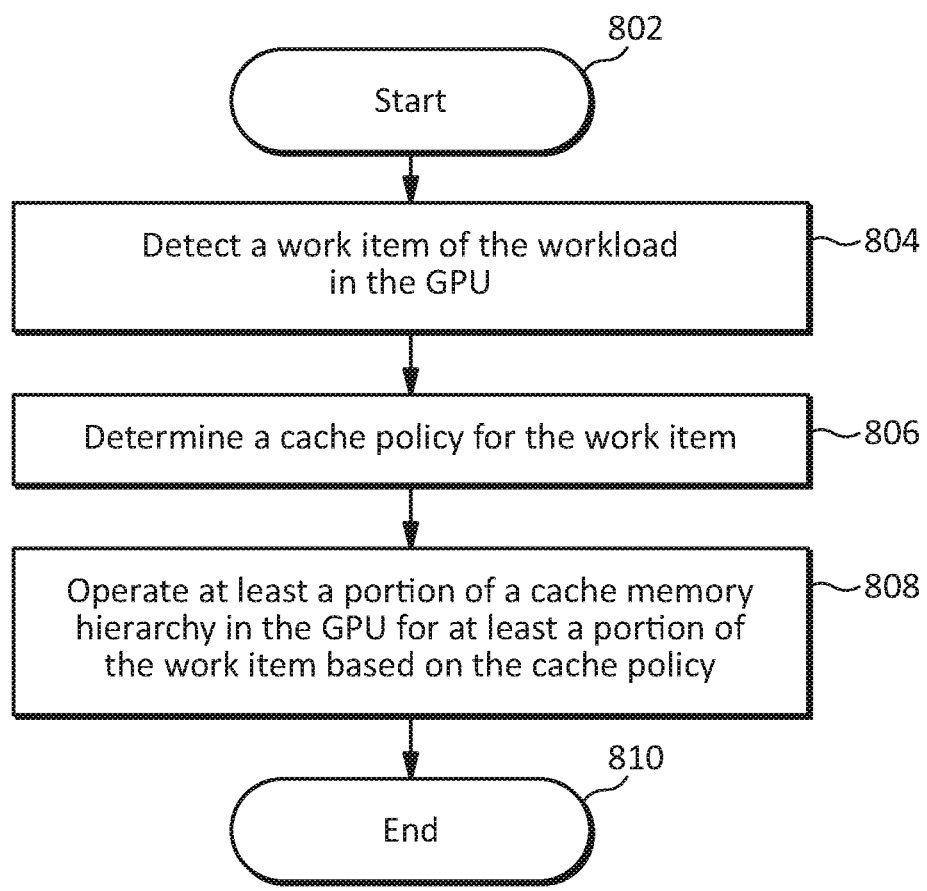
FIG. 8 illustrates an embodiment of a method of processing a workload in a GPU according to this disclosure.

FIG. 8 illustrates an embodiment of a method of processing a workload in a GPU according to this disclosure. The method may begin at operation 802. At operation 804, the method may detect a work item of the workload in the GPU.

At operation 806, the method may determine a cache policy for the work item. At operation 808, the method may operate at least a portion of a cache memory hierarchy in the GPU for at least a portion of the work item based on the cache policy. The method may terminate at operation 810.

The operations and/or components described with respect to the embodiment illustrated in FIG. 8, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Although some embodiments have been described in the context of GPUs, the inventive principles may be applied to other types of processing systems as well.

Figure 9:
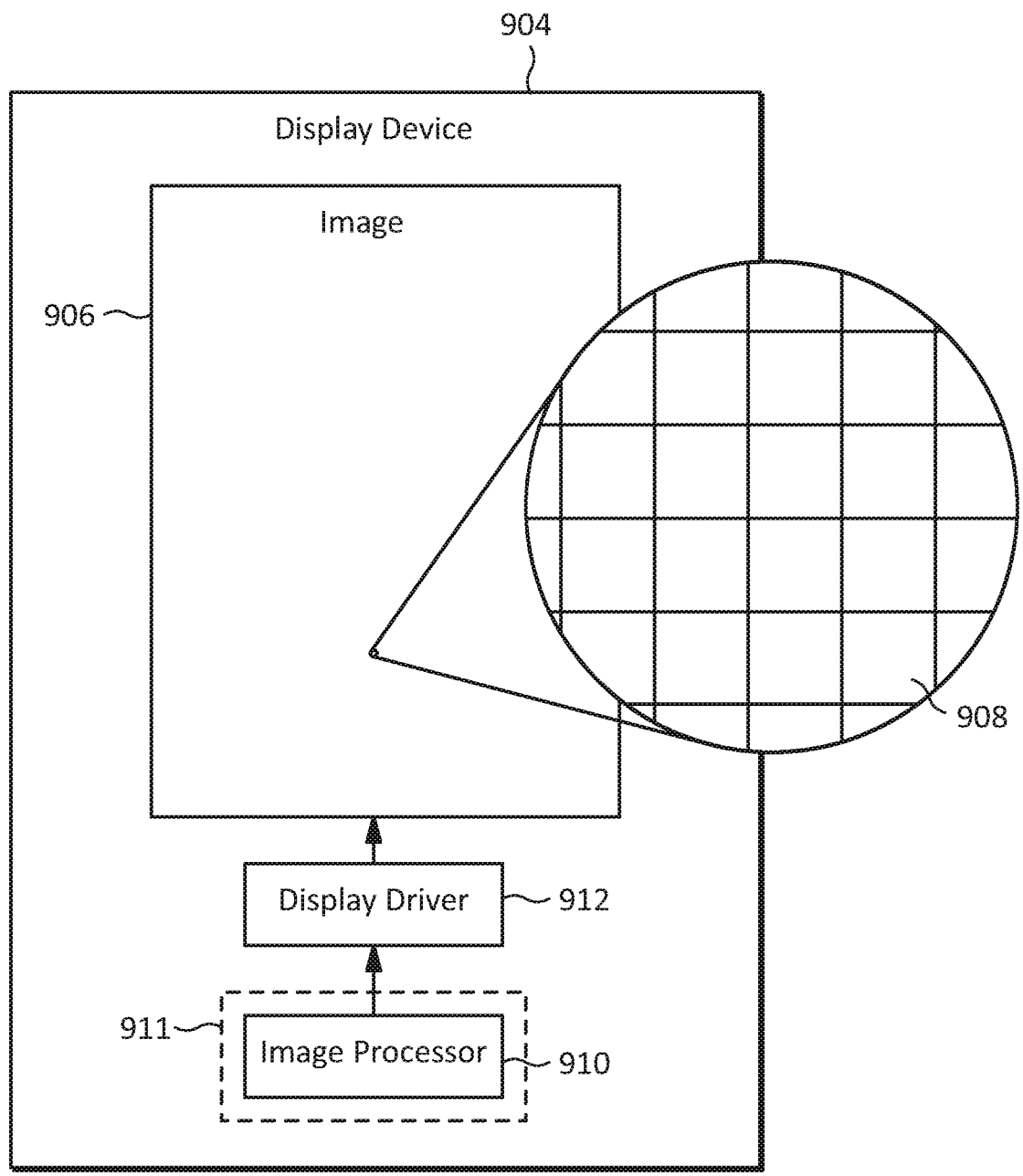
FIG. 9 illustrates an embodiment of an image display device into which any of the methods or apparatus described in this disclosure may be integrated.

FIG. 9 illustrates an embodiment of an image display device 904 into which any of the methods or apparatus described in this disclosure may be integrated. The display device 904 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 906 with pixels. An image processor 910 such as graphics processing unit (GPU) and/or driver circuit 912 may process and/or convert the image to a form that may be displayed on or through the imaging device 904. A portion of the image 906 is shown enlarged so pixels 908 are visible. Any of the methods or apparatus described in this disclosure may be integrated into the imaging device 904, processor 910, and/or display driver circuit 912 to generate pixels 908 shown in FIG. 9, and/or groups thereof. In some embodiments, the image processor 910 may include a pipeline, a cache hierarchy, and/or traffic control logic that may implement one or more work item aware caches policies and any of the other inventive principles described herein, implemented, for example, on an integrated circuit 911. In some embodiments, the integrated circuit 911 may also include the driver circuit 912 and/or any other components that may implement any other functionality of the display device 904.

Figure 10:
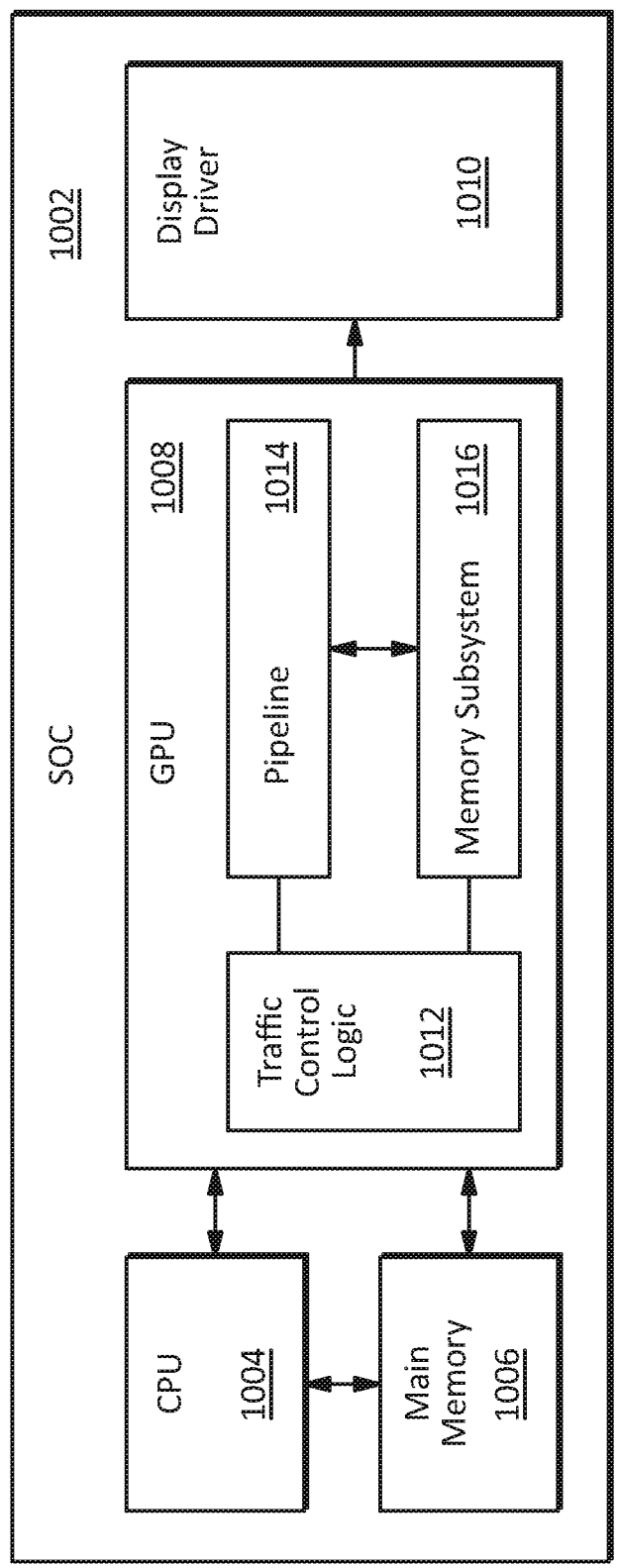
FIG. 10 illustrates an embodiment of a system-on-chip (SOC) device including a GPU that may implement work item aware cache polices according to this disclosure.

FIG. 10 illustrates an embodiment of a system-on-chip (SOC) device including a GPU that may implement work item aware cache polices according to this disclosure. The SOC 1002 may include a central processing unit 1004, a main memory 1006, a GPU 1008, and a display driver 1010. The GPU 1008 may include traffic control logic 1012, a pipeline 1014, and a memory subsystem 1016 which may be implemented, for example, in a manner similar to those described above with respect to FIGS. 1-2 and 4-7 and which may implement any of the work item aware cache policies disclosed herein, including, for example, those described above with respect to FIGS. 3 and 8. The SOC 1002 illustrated in FIG. 10 may be integrated, for example, into a image display device such as the embodiment illustrated in FIG. 9.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple processes, steps, etc. may be integrated into a single process, step, etc. A reference to a component or element may refer to only a portion of the component or element. In some embodiments, determined may also refer to determined at least in part, detected may refer to detected at least in part, and based on may refer to based at least in part.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

What is claimed is:

1. A method of processing a workload in a graphics processing unit (GPU), the method comprising:
   detecting a work item of a pass or sub-pass of the workload in the GPU;
   determining a cache policy for the work item based, at least in part, on a characteristic of the work item; and
   operating at least a portion of a cache memory hierarchy in the GPU for at least a portion of the work item based on the cache policy.

2. The method of claim 1, wherein the work item is detected based on information received from an application.

3. The method of claim 1, wherein the work item is detected based on monitoring one or more performance counters.

4. The method of claim 3, wherein at least one of the one or more performance counters is monitored by a driver.

5. The method of claim 3, wherein at least one of the one or more performance counters is monitored by hardware detection logic.

6. The method of claim 1, wherein the cache policy is determined based on a memory request from a client.

7. The method of claim 6, wherein the memory request comprises a work item identifier (ID).

8. The method of claim 1, wherein the cache policy for the work item comprises a static cache policy.

9. The method of claim 1, wherein the cache policy for the work item comprises a dynamic cache policy.

10. The method of claim 1, wherein the cache policy for the work item is determined based on an identity of the work item.

11. The method of claim 10, wherein the identity of the work item is mapped to the cache policy.

12. The method of claim 1, further comprising:
    monitoring one or more performance counters;
    wherein the cache policy for the work item is determined based on the one or more performance counters.

13. The method of claim 12, wherein the cache policy for the work item is mapped to the one or more performance counters.

14. The method of claim 12, wherein the cache policy comprises a first cache policy, the method further comprising:
  determining a second cache policy for the work item based on the one or more performance counters; and
  selecting one of the first or second cache policies for the work item.

15. The method of claim 14, wherein the cache policy for the work item is selected based on a runtime learning model.

16. The method of claim 1, further comprising:
  monitoring one or more performance counters;
  wherein the cache policy for the work item is determined based on a combination of an identity of the work item and the one or more performance counters.

17. The method of claim 1, further comprising:
  monitoring one or more performance counters; and
  changing the cache policy for the work item based on the one or more performance counters.

18. An apparatus comprising:
  a graphics processing pipeline comprising one or more clients;
  a cache memory hierarchy configured to process memory requests from the one or more clients; and
  policy selection logic configured to:
    determine a first cache policy for a first work item for at least one of the one or more clients;
    apply the first cache policy to at least a portion of the cache memory hierarchy for at least a portion of the first work item;
    determine a second cache policy for a second work item for the at least one of the one or more clients; and
    apply the second cache policy to at least a portion of the cache memory hierarchy for at least a portion of the second work item;
  wherein:
    the first work item is based on a first portion comprising a first pass or sub-pass of a workload for the one or more clients; and
    the second work item is based on a second portion comprising a second pass or sub-pass of the workload for the one or more clients.

19. The apparatus of claim 18, wherein:
the first pass or sub-pass uses the one or more clients; and
the second pass or sub-pass uses the one or more clients.

20. A memory subsystem comprising:
a memory interface;
a cache memory hierarchy configured to process memory requests from one or more clients through the memory interface; and
policy selection logic configured to:
  determine a cache policy for a work item of a pass or sub-pass of a workload, for at least one of the one or more clients based, at least in part, on a characteristic of the work item; and
  apply the cache policy to at least a portion of the cache memory hierarchy for at least a portion of the work item.

* * * * *